US012703323B2

(12) United States Patent
Guo et al.

(10) Patent No.: US 12,703,323 B2
(45) Date of Patent: Aug. 11, 2026

(54) METHOD AND APPARATUS FOR CONTROLLING WELCOMING OF VEHICLE, MEDIUM, DEVICE, AND VEHICLE

(71) Applicant: BYD COMPANY LIMITED, Shenzhen (CN)

(72) Inventors: Maorong Guo, Shenzhen (CN); Lihua Wu, Shenzhen (CN); Juan Liu, Shenzhen (CN); Guilin Qin, Shenzhen (CN); Jinhua Zhang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 114 days.

(21) Appl. No.: 18/383,572

(22) Filed: Oct. 25, 2023

(65) Prior Publication Data

US 2024/0059248 A1 Feb. 22, 2024

Related U.S. Application Data

(63) Continuation of application No. PCT/CN2022/083388, filed on Mar. 28, 2022.

(30) Foreign Application Priority Data

Jun. 28, 2021 (CN) ........................ 202110721535.8

(51) Int. Cl.
*B60R 25/24* (2013.01)
*G07C 9/00* (2020.01)
(Continued)

(52) U.S. Cl.
CPC .......... *B60R 25/24* (2013.01); *G07C 9/00309* (2013.01); *G10L 15/22* (2013.01); *H04L 63/0442* (2013.01); *G10L 2015/223* (2013.01)

(58) Field of Classification Search
None
See application file for complete search history.

(56) References Cited

U.S. PATENT DOCUMENTS 8,918,231 B2 12/2014 Rovik
9,990,789 B2 * 6/2018 Kim .................. G07C 9/00182
(Continued)

FOREIGN PATENT DOCUMENTS

CN 104424730 A 3/2015
CN 110803127 A 2/2020
(Continued)

OTHER PUBLICATIONS

International Search Report and Written Opinion for Application No. PCT/CN2022/083388, mailed on Jun. 30, 2022, 9 pages.

*Primary Examiner* — Carlos Garcia
(74) *Attorney, Agent, or Firm* — Sheppard Mullin Richter & Hampton LLP

(57) ABSTRACT

A method for controlling a vehicle welcoming to a user, includes: recognizing, by a processor of the vehicle, an identification (ID) of a target vehicle key; searching, by the processor, a correspondence for a welcoming manner corresponding to the ID of the target vehicle key, the correspondence comprising a plurality of IDs of a plurality of vehicle keys and a plurality of welcoming manners corresponding to the IDs of the vehicle keys; and controlling, by the processor, the vehicle to perform a first welcoming action in the welcoming manner.

20 Claims, 5 Drawing Sheets

(51) Int. Cl.
*G10L 15/22* (2006.01)
*H04L 9/40* (2022.01)

(56) References Cited

U.S. PATENT DOCUMENTS

| | | | | |
|---|---|---|---|---|
| 11,745,700 | B2 * | 9/2023 | Rocroi | B60R 25/34 701/23 |
| 2008/0154613 | A1 | 6/2008 | Haulick et al. | |
| 2014/0309886 | A1 * | 10/2014 | Ricci | G06Q 20/308 701/41 |
| 2018/0053416 | A1 * | 2/2018 | Sanji | G08G 1/005 |
| 2019/0114851 | A1 * | 4/2019 | Lee | H04W 12/02 |
| 2020/0139932 | A1 | 5/2020 | Wood et al. | |
| 2023/0073436 | A1 * | 3/2023 | Kent | B60R 25/245 |
| 2024/0059248 | A1 * | 2/2024 | Guo | G07C 9/00309 |

FOREIGN PATENT DOCUMENTS

| | | | | |
|---|---|---|---|---|
| CN | 110920562 | A | 3/2020 | |
| CN | 112193205 | A | 1/2021 | |
| CN | 112238832 | A | 1/2021 | |
| CN | 112937383 | A | 6/2021 | |
| CN | 111591236 | B | 1/2022 | |
| FR | 2980884 | A1 * | 4/2013 | G06Q 10/06 |
| JP | 2005273338 | A | 10/2005 | |
| JP | 2006347299 | A | 12/2006 | |
| JP | 2016182855 | A | 10/2016 | |
| JP | 2019183504 | A | 10/2019 | |
| KR | 101682304 | B1 | 12/2016 | |
| KR | 2020-0008267 | A | 1/2020 | |
| KR | 2021-0076365 | A | 6/2021 | |
| WO | 2017097471 | A1 | 6/2017 | |

* cited by examiner

METHOD AND APPARATUS FOR CONTROLLING WELCOMING OF VEHICLE, MEDIUM, DEVICE, AND VEHICLE

CROSS-REFERENCE TO RELATED APPLICATIONS

This application is a Continuation application of International Patent Application No. PCT/CN2022/083388, filed on Mar. 28, 2022, which is based on and claims priority to and benefits of Chinese Patent Application No. 202110721535.8, filed on Jun. 28, 2021. The entire content of all of the above-referenced applications is incorporated herein by reference.

FIELD

The present disclosure relates to the field of technologies for controlling welcoming of vehicles, and more particularly, to a method and an apparatus for controlling welcoming of a vehicle, a medium, a device, and a vehicle.

BACKGROUND

With the gradual popularization of vehicles, people impose higher requirements for auxiliary functions of vehicles. A welcoming function of vehicles or a function of the vehicle welcoming a user is a new auxiliary function emerged in recent years. When a user is about to drive a vehicle, the vehicle automatically performs a series of welcoming actions, which not only helps the user get on and start the vehicle more efficiently and conveniently, but also provides a relatively strong sense of ritual. For example, the welcoming function includes turning on a welcoming light of the vehicle and extending a welcoming pedal.

SUMMARY

The present disclosure provides a relatively flexible and personalized method and apparatus for controlling a vehicle welcoming a user, a medium, a device, and a vehicle.

In order to achieve the above objective, the present disclosure provides a method for controlling a vehicle welcoming a user. The method includes: recognizing, by a processor of the vehicle, an identification (ID) of a target vehicle key; searching, by the processor, a correspondence for a welcoming manner corresponding to the ID of the target vehicle key, the correspondence comprising a plurality of IDs of a plurality of vehicle keys and a plurality of welcoming manners corresponding to the IDs of the vehicle keys; and controlling, by the processor, the vehicle to perform a first welcoming action in the welcoming manner.

According to an embodiment of the present disclosure, the method further includes: communicating with the target vehicle key and recognizing the ID of the target vehicle key when a distance between the target vehicle key and the vehicle is less than a first threshold.

According to an embodiment of the present disclosure, communicating with the target vehicle key and recognizing the ID of the target vehicle key comprises: communicating with the target vehicle key through wireless communication, and connecting to and pairing with the target vehicle key; receiving a public key and ciphertext sent by the target vehicle key, wherein the target vehicle key generates a public-private key pair, encrypts the ID of the target vehicle key by using a private key of the public-private key pair to obtain the ciphertext, and sends the ciphertext and the public key of the public-private key pair to the vehicle; and decrypting the ciphertext based on the public key to obtain the ID of the target vehicle key.

According to an embodiment of the present disclosure, after the recognizing the ID of the target vehicle key, the method further includes: detecting a first distance between the target vehicle key and the vehicle with a first ranging method, and in response to that the first distance is less than a second threshold, detecting a second distance between the target vehicle key and the vehicle with a second ranging method. The controlling the vehicle to perform a first welcoming action in the welcoming manner includes: in response to that the second distance is less than a third threshold, controlling the vehicle to perform the first welcoming action in the welcoming manner, wherein the first threshold is greater than the second threshold, the second threshold is greater than the third threshold, and a measurement precision of the second ranging method is higher than a measurement precision of the first ranging method.

According to an embodiment of the present disclosure, the method further includes: obtaining an ambient volume of an environment where the vehicle is located; in response to that the second distance is less than the third threshold and the ambient volume is less than a volume threshold, obtaining a voice instruction around the vehicle; in response to that the second distance is less than a fourth threshold and the ambient volume is greater than or equal to the volume threshold, obtaining the voice instruction around the vehicle, the fourth threshold being less than the third threshold; and controlling the vehicle to perform a second welcoming action indicated in the voice instruction.

According to an embodiment of the present disclosure, the method further includes: obtaining a control instruction sent by the target vehicle key and a charging status of the vehicle; and controlling the vehicle to perform a third welcoming action indicated in the control instruction in response to that the charging status of the vehicle is greater than a charging status threshold.

According to an embodiment of the present disclosure, the method further includes: detecting orientation information of the target vehicle key relative to the vehicle. The obtaining a voice instruction around the vehicle includes: obtaining an orientation corresponding to the orientation information from a plurality of orientations around the vehicle, and obtaining a voice instruction for the orientation corresponding to the orientation information.

According to an embodiment of the present disclosure, the method further includes: detecting orientation information of the target vehicle key relative to the vehicle. The obtaining a voice instruction around the vehicle includes: obtaining a voice instruction in each of a plurality of orientations around the vehicle to obtain a voice instruction set, and obtaining a welcoming action corresponding to each of the voice instructions in the voice instruction set; and the controlling the vehicle to perform a second welcoming action indicated in the voice instruction includes: determining whether a welcoming action corresponding to a first voice instruction in the voice instruction set conflicts with the second welcoming action indicated in the voice instruction for the orientation corresponding to the orientation information; in response to that the welcoming action corresponding to the first voice instruction in the voice instruction set conflicts with the second welcoming action indicated in the voice instruction for the orientation corresponding to the orientation information, deleting the first voice instruction in the voice instruction set to obtain an updated voice instruction set; and controlling the vehicle to perform a welcoming action indicated in each voice instruction in the updated voice instruction set.

The present disclosure further provides an apparatus for controlling a vehicle welcoming a user. The apparatus includes: a searching module, configured to recognize an identification (ID) of a target vehicle key; search a correspondence for a welcoming manner corresponding to the ID of the target vehicle key, the correspondence includes a plurality of IDs of a plurality of vehicle keys and a plurality of welcoming manners corresponding to the IDs of the vehicle keys; and a control module, configured to control the vehicle to perform a first welcoming action in the welcoming manner.

The present disclosure further provides a non-transitory computer-readable storage medium storing a computer program. When the computer program is executed by a processor, the steps of the above method provided in the present disclosure are implemented.

The present disclosure further provides an electronic device, which includes: a memory, storing a computer program; and a processor, configured to execute the computer program in the memory to implement the steps of the above method provided in the present disclosure.

The present disclosure further provides a vehicle, which includes the above apparatus for controlling a vehicle welcoming a user.

In the above technical solution, a dedicated welcoming manner is preconfigured for vehicle keys with different IDs, and when an ID of a vehicle key is recognized, a welcoming manner corresponding to the ID is used. In this way, different welcoming manners can be configured for different vehicle keys of the same vehicle, thereby achieving personalized welcoming for multiple owners, and satisfying a personalized requirement of each owner.

Other features and advantages of the present disclosure will be described in detail in the following detailed description.

BRIEF DESCRIPTION OF THE DRAWINGS

The drawings provide further understanding of the present disclosure and constitute a part of this specification. The drawings and the following detailed description are used together for explaining the present disclosure rather than limiting the present disclosure. In the drawings.

DETAILED DESCRIPTION

Some implementations of the present disclosure are described in detail below with reference to the drawings. It should be understood that the implementations described herein are merely used to describe and explain the present disclosure, and do not limit the present disclosure.

In the present disclosure, unless stated to the contrary, orientational words such as “left, right, front, and rear” are generally used relative to a direction of a vehicle during normal travelling.

Figures 1, 2:
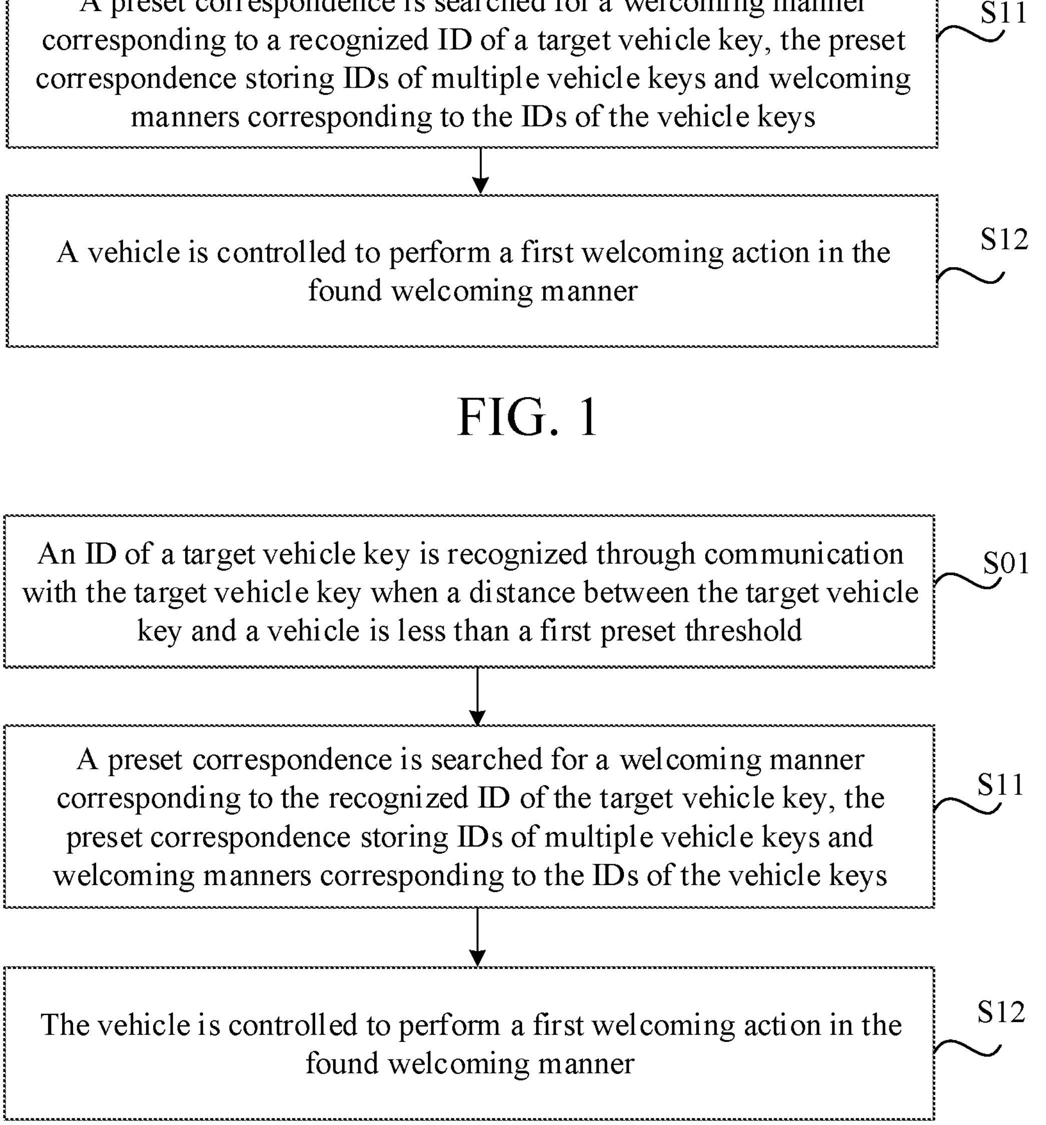
FIG. 1 is a flowchart of a method for controlling welcoming of a vehicle according to an embodiment of the present disclosure.
FIG. 2 is a flowchart of a method for controlling welcoming of a vehicle according to another embodiment of the present disclosure.

FIG. 1 is a flowchart of a method for controlling welcoming of a vehicle according to an embodiment of the present disclosure. As shown in FIG. 1, the method may include the following steps:

Step S11: A preset correspondence is searched for a welcoming manner corresponding to a recognized identification (ID) of a target vehicle key, the preset correspondence storing IDs of multiple vehicle keys and welcoming manners corresponding to the IDs of the vehicle keys.

Step S12: A vehicle is controlled to perform a first welcoming action in the found welcoming manner.

The method of the present disclosure is applied to a vehicle. The vehicle is equipped with multiple vehicle keys. The vehicle keys may be mobile terminals held by users, such as a smartphone. The IDs of the vehicle keys may be code numbers of the smartphones of the users. The IDs of multiple vehicle keys and the welcoming manners corresponding to the IDs may be pre-stored in the vehicle. If a family has a vehicle, each of multiple persons in the family may hold a vehicle key and unlock the vehicle with the vehicle key.

In this way, after the target vehicle key establishes the communication with the vehicle, the vehicle may act in the corresponding welcoming manner based on the recognized ID of the target vehicle key. For example, different lights, music, and pedal stretching/retraction functions are adopted.

In the above technical solution, a dedicated welcoming manner is preconfigured for the vehicle keys with different IDs, and when an ID of a vehicle key is recognized, a welcoming manner corresponding to the ID is used. In this way, different welcoming manners can be configured for different vehicle keys of the same vehicle, thereby achieving personalized welcoming for multiple owners, and satisfying a personalized requirement of each owner.

FIG. 2 is a flowchart of a method for controlling welcoming of a vehicle according to another embodiment of the present disclosure. As shown in FIG. 2, based on FIG. 1, the method further includes step S01.

Step S01: The ID of the target vehicle key is recognized through communication with the target vehicle key when a distance between the target vehicle key and the vehicle is less than a first preset threshold.

The communication between the vehicle and the target vehicle key may be performed through Bluetooth, in a low-frequency manner, in a radio-frequency manner, or the like. When the distance between the target vehicle key and the vehicle is less than the first preset threshold, the target vehicle key may communicate with the vehicle if the target vehicle key enters an effective communication range.

In another embodiment, based on FIG. 1, step S01 of recognizing the ID of the target vehicle key through communication with the target vehicle key may include:

connecting to and pairing with the target vehicle key through wireless communication (for example, Bluetooth, a low-frequency manner, or a radio-frequency manner);

receiving a public key and ciphertext sent by the target vehicle key, where the target vehicle key generates a public-private key pair (which may be obtained from a certificate authority (CA)), encrypts the ID of the target vehicle key by using a private key of the public-private key pair to obtain the ciphertext, and sends the ciphertext and the public key of the public-private key pair to the vehicle; and decrypting the ciphertext based on the public key, to obtain the ID of the target vehicle key.

In this embodiment, through a principle of asymmetric encryption, the vehicle can recognize the target vehicle key more reliably.

Figure 3:
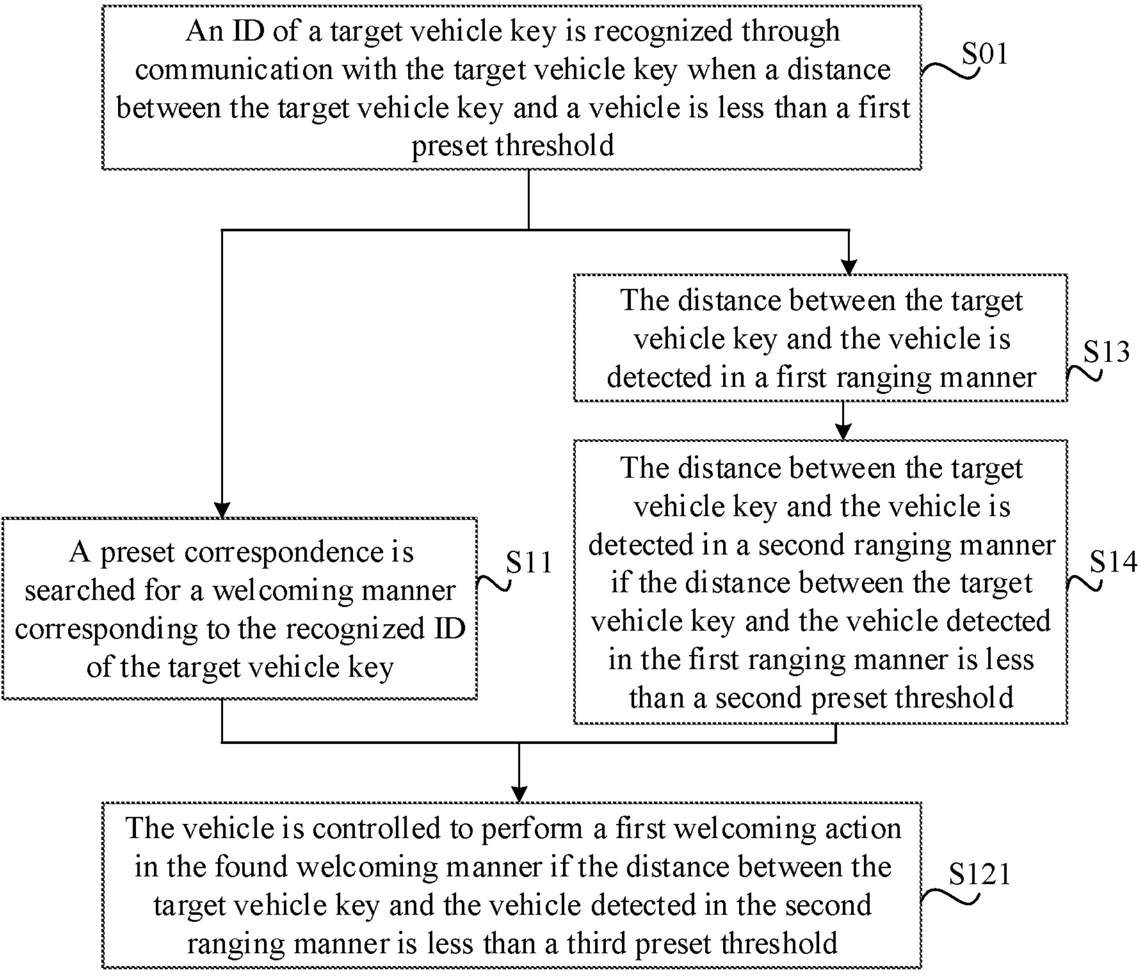
FIG. 3 is a flowchart of a method for controlling welcoming of a vehicle according to still another embodiment of the present disclosure.

FIG. 3 is a flowchart of a method for controlling welcoming of a vehicle according to still another embodiment of the present disclosure. As shown in FIG. 3, based on FIG. 2, after step S01 of recognizing the ID of the target vehicle key, the method may further include following steps:

Step S13: The distance (e.g., a first distance) between the target vehicle key and the vehicle is detected with a first ranging manner/method, which can detect the distance (for example, a Bluetooth low energy (BLE) manner).

Step S14: The distance (e.g., a second distance) between the target vehicle key and the vehicle is detected with a second ranging manner/method, which can detect the distance (for example, an ultra wide band (UWB) manner) if the distance between the target vehicle key and the vehicle detected in the first ranging manner is less than a second preset threshold.

In this embodiment, step S12 of controlling the vehicle to perform the first welcoming action in the found welcoming manner may include step S121.

Step S121: The vehicle is controlled to perform the first welcoming action in the found welcoming manner if the distance between the target vehicle key and the vehicle detected in the second ranging manner is less than a third preset threshold. The first preset threshold (for example, 100 m) is greater than the second preset threshold (for example, 15 m), the second preset threshold is greater than the third preset threshold (for example, 10 m), and a measurement precision of the second ranging manner is higher than a measurement precision of the first ranging manner.

If the vehicle recognizes the ID of the target vehicle key, that is, recognizes the owner, the distance between the target vehicle key and the vehicle already falls within a range (the first preset threshold). In this case, the distance between the target vehicle key and the vehicle is detected in the first ranging manner with a low precision, which requires less power consumption during monitoring the distance to the target vehicle key. If the target vehicle key further approaches the vehicle until the distance to the vehicle is less than the second preset threshold, the distance may be more precisely measured in the second ranging manner, so that the vehicle can perform a more dedicated welcoming strategy. When the distance between the target vehicle key and the vehicle is less than the third preset threshold, it may be considered that the owner enters a range with a relatively good welcoming effect. In the range, the owner can feel the welcoming ceremony more clearly and intuitively, and electricity consumption caused by excessively early start of the welcoming action can be avoided.

Figure 4:
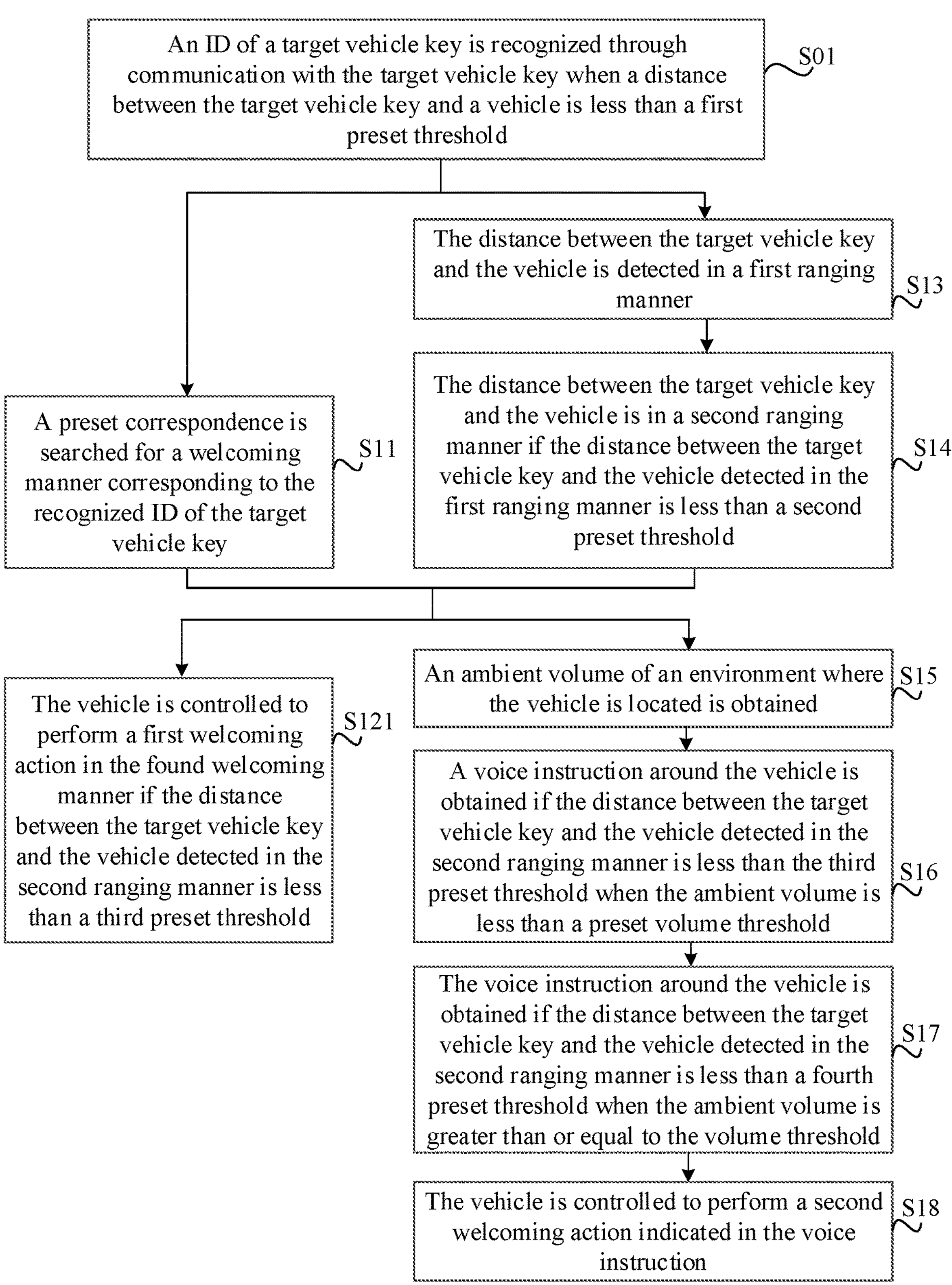
FIG. 4 is a flowchart of a method for controlling welcoming of a vehicle according to yet another embodiment of the present disclosure.

FIG. 4 is a flowchart of a method for controlling welcoming of a vehicle according to yet another embodiment of the present disclosure. As shown in FIG. 4, based on FIG. 3, the method may further include the following steps:

Step S15: An ambient volume of an environment where the vehicle is located is obtained.

Step S16: A voice instruction around the vehicle is obtained if the distance between the target vehicle key and the vehicle detected in the second ranging manner is less than the third preset threshold when the ambient volume is less than a preset volume threshold.

Step S17: The voice instruction around the vehicle is obtained if the distance between the target vehicle key and the vehicle detected in the second ranging manner is less than a fourth preset threshold when the ambient volume is greater than or equal to the volume threshold, the fourth preset threshold being less than the third preset threshold.

Step S18: The vehicle is controlled to perform a second welcoming action indicated in the voice instruction.

A sound acquisition device may be arranged on outside of the vehicle to obtain voice information around the vehicle, and the voice instruction (for example, opening a trunk, opening a door, and opening a sunroof) may be obtained through a speech recognition technology. The vehicle may pre-store to-be-performed actions corresponding to multiple voice instructions. One or more sound acquisition devices may be arranged on the outside of the vehicle. If multiple sound acquisition devices are arranged at different locations, voice information for multiple orientations around the vehicle can be received. When the distance between the target vehicle key and the vehicle is less than the third preset threshold, it may be considered that the distance between the vehicle owner and the vehicle is relatively small. In this case, based on the first welcoming action, the second welcoming action may be provided to the vehicle owner through execution of the voice instruction, to meet a temporary requirement of the vehicle owner.

The sound acquisition device may be further configured to obtain the ambient volume. If the ambient volume is less than the preset volume threshold, it may be considered that the environment is relatively quiet. In this case, the voice instruction around the vehicle may be obtained when the owner is relatively far away (the distance is less than the third preset threshold). If the ambient volume is greater than or equal to the preset volume threshold, it may be considered that the environment is relatively noisy. In this case, the voice instruction around the vehicle may be obtained when the vehicle owner is relatively close (the distance is less than the fourth preset threshold).

In this embodiment, the voice instruction is recognized in consideration of impact of environmental noise, so that a voice of the owner can be recognized more accurately, the second welcoming action can be more effective, and misjudgment can be avoided.

In some embodiments, based on FIG. 4, the method further includes: detecting orientation information of the target vehicle key relative to the vehicle.

In this embodiment, the obtaining of the voice instruction around the vehicle may include: obtaining a voice instruction for an orientation of a plurality of orientations around the vehicle corresponding to the orientation information.

During the detection of the distance, the orientation information of the target vehicle key relative to the vehicle may be further determined in a wireless communication manner, to accurately recognize an orientation of the owner. In this case, the voice information for the orientation of the owner may be obtained. Voice information for another orientation is not obtained. In an embodiment, the sound acquisition device corresponding to the orientation of the owner may be turned on, and the sound acquisition device in another orientation is not turned on.

Figure 5:
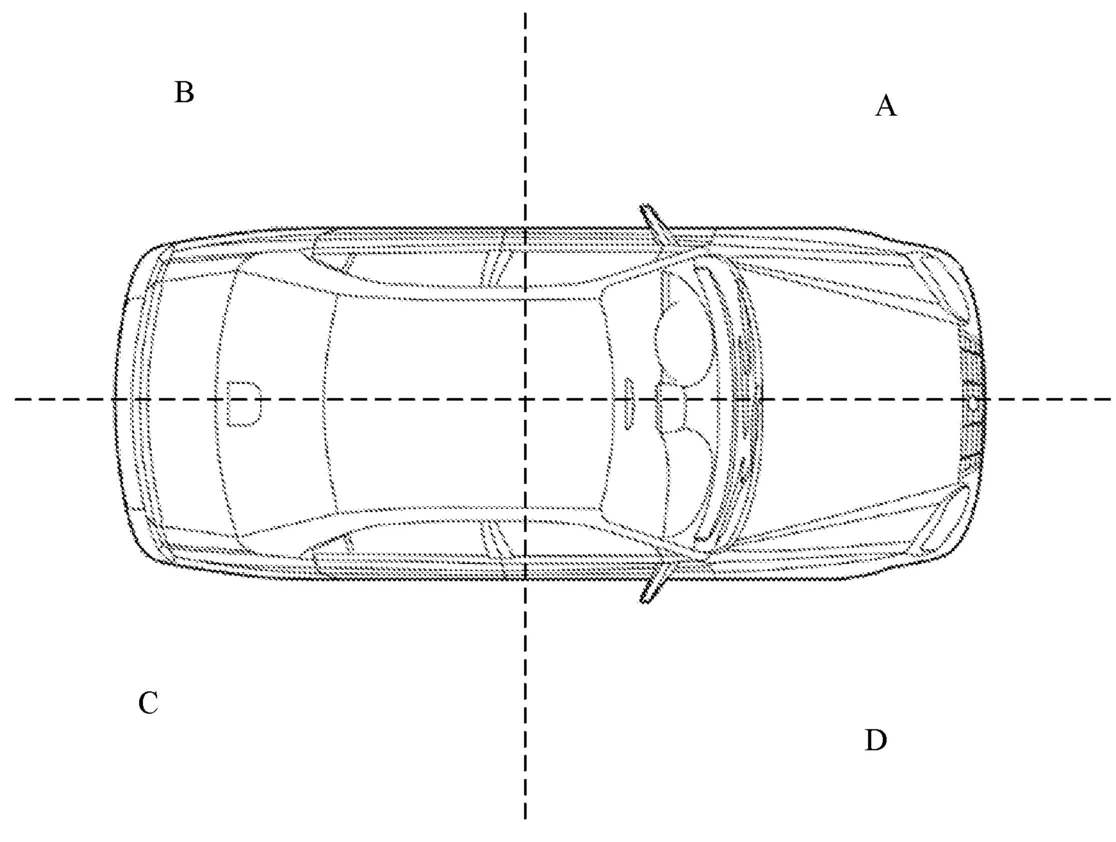
FIG. 5 is a schematic diagram of orientations around a vehicle according to an embodiment of the present disclosure.

FIG. 5 is a schematic diagram of orientations around a vehicle according to an embodiment of the present disclosure. As shown in FIG. 5, the orientations around the vehicle include four orientations: a left front orientation A, a left rear orientation B, a right rear orientation C, and a right front orientation D. One sound acquisition device is arranged in each orientation. If the orientation information of the target vehicle key corresponds to the left front orientation A, the sound acquisition device in the left front orientation A may be turned on, and the sound acquisition devices in other orientations are not turned on. In this way, the vehicle is prevented from executing a voice instruction from a non-owner, which realizes high safety.

That a voice instruction in another orientation is allowed to be executed but the instruction of the owner needs to be preferentially executed may be configured. In still another embodiment, based on FIG. 4, the method further includes: detecting orientation information of the target vehicle key relative to the vehicle.

The obtaining of the voice instruction around the vehicle includes: obtaining a voice instruction in each of the plurality of orientations around the vehicle to obtain a voice instruction set.

The step of controlling the vehicle to perform the second welcoming action indicated in the voice instruction may include: deleting a conflicting instruction in the voice instruction set, where the second welcoming action indicated in the conflicting instruction conflicts with the second welcoming action indicated in the voice instruction for the orientation corresponding to the orientation information; and controlling the vehicle to perform a second welcoming action indicated in each voice instruction in the voice instruction set after the conflicting instruction is deleted.

That is to say, the sound acquisition devices on the outside of the vehicle are turned on and can execute the voice instructions in the multiple orientations. However, if the voice instruction for the orientation of the target vehicle key conflicts with the voice instruction for another orientation, the voice instruction for another orientation is deleted, and the voice instruction for the orientation of the target vehicle key is executed. That is to say, the instruction of the owner needs to be preferentially executed.

The conflicting instruction may be an instruction with a same controlled object but an opposite target direction. For example, two voice instructions respectively indicating opening of a sunroof and closing of the sunroof indicate the same controlled object, that is, the sunroof, but respectively indicate a backward target direction and a forward target direction, which are opposite target directions.

That the instruction of the owner needs to be preferentially executed may be as follows: When the voice instruction for the orientation of the target vehicle key (the instruction of the owner) and the voice instruction for another orientation (an instruction of a non-owner) are obtained, the instruction of the owner is executed first, and then the instruction of the non-owner is executed; or only the instruction of the owner is executed and the instruction of the non-owner is not executed; or only the instruction of the owner is executed when the instructions conflict with each other.

For example, an instruction indicating that the sunroof needs to be opened is obtained from the owner first, and the sunroof is controlled to be opened. Then an instruction indicating that the sunroof needs to be closed is obtained from a non-owner later. In this case, the instruction is a conflicting instruction. Therefore, the instruction is deleted, and the sunroof is not controlled to be closed. For another example, an instruction indicating that the sunroof needs to be opened is obtained from a non-owner first, and the sunroof is controlled to be opened. Then an instruction indicating that the sunroof needs to be closed is obtained from the owner later. In this case, the instruction indicating that the sunroof needs to be opened is a conflicting instruction. Therefore, the instruction is deleted, and the sunroof is controlled to be closed.

In this embodiment, the owner and the non-owner are recognized based on voice orientations, and the instruction of the owner is preferentially executed, thereby avoiding malicious control of the vehicle by the non-owner, and improving operation safety of the vehicle.

Moreover, this embodiment is applicable to a situation where the owner allows passengers to participate in controlling the welcoming manner, especially a situation such as display of vehicle functions. In this way, efficiency of displaying the vehicle for multiple persons is improved.

In a feasible implementation, the vehicle key of the vehicle may exist in each of the multiple orientations around the vehicle. When the vehicle recognizes the IDs of the target vehicle keys in the multiple orientations, the vehicle may find the welcoming manner corresponding to the ID of each target vehicle key, and then the vehicle controls a controlled object corresponding to the orientation to perform a welcoming action based on the welcoming manner corresponding to the ID of the target vehicle key in each orientation. For example, multiple members of a family share a vehicle. At some moment, a member A carrying a vehicle key 1 is located on a left side of the vehicle, and a member B carrying a vehicle key 2 is located on a right side of the vehicle. A welcoming manner corresponding to the vehicle key 1 is to turn on a red light, and a welcoming manner corresponding to the vehicle key 2 is to turn on a green light. In this case, the vehicle may control a left side light of the vehicle to be red and a right side light of the vehicle to be green.

In some other embodiments, the owner may alternatively send the welcoming instruction through a button on the key. The method may further include: obtaining a control instruction sent by the target vehicle key and a remaining state of charge of the vehicle (e.g., the charging status of the vehicle); and controlling the vehicle to perform a third welcoming action indicated in the control instruction if the remaining state of charge of the vehicle is greater than a preset state of charge threshold (e.g., the charging status threshold).

If the remaining state of charge of a power battery of the vehicle is greater than the preset state of charge threshold, it may be considered that the vehicle has a sufficient remaining state of charge and may perform the third welcoming action indicated by the target vehicle key. If the remaining state of charge of the vehicle is less than or equal to the preset state of charge threshold, it may be considered that the vehicle has a small remaining state of charge. In order to save power and ensure endurance, the third welcoming action indicated by the target vehicle key is not performed. In this way, when the power battery of the vehicle has a sufficient state of charge, the vehicle may execute the welcoming instruction sent through the button of the target vehicle key, which realizes high reliability.

The state of charge threshold, the volume threshold, the first preset threshold, the second preset threshold, the third preset threshold, and the fourth preset threshold described above all may be obtained through experiments or from experience.

Figure 6:
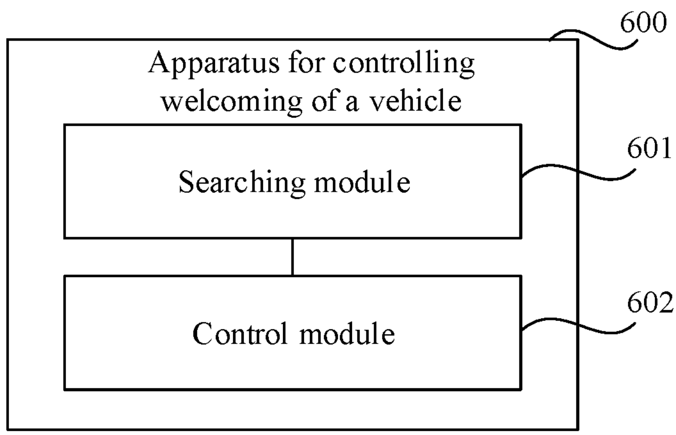
FIG. 6 is a block diagram of an apparatus for controlling welcoming of a vehicle according to an embodiment of the present disclosure.

FIG. 6 is a block diagram of an apparatus for controlling welcoming of a vehicle according to an embodiment of the present disclosure. As shown in FIG. 6, the apparatus 600 for controlling welcoming of a vehicle may include a searching module 601 and a control module 602.

The searching module 601 is configured to search a preset correspondence for a welcoming manner corresponding to a recognized ID of a target vehicle key, the preset correspondence storing IDs of a plurality of vehicle keys and welcoming manners corresponding to the IDs of the vehicle keys.

The control module 602 is configured to control the vehicle to perform a first welcoming action in the found welcoming manner.

In some embodiments of the present disclosure, the apparatus 600 for controlling welcoming of a vehicle may further include a recognition module.

The recognition module is configured to recognize the ID of the target vehicle key through communication with the target vehicle key when a distance between the target vehicle key and the vehicle is less than a first preset threshold.

In some embodiments of the present disclosure, the recognition module may be configured to:

- connect to and pair with the target vehicle key through wireless communication;
- receive a public key and ciphertext sent by the target vehicle key, where the target vehicle key generates a public-private key pair, encrypts the ID of the target vehicle key by using a private key in the public-private key pair to obtain the ciphertext, and sends the ciphertext and the public key in the public-private key pair to the vehicle; and
- decrypt the ciphertext based on the public key, to obtain the ID of the target vehicle key.

In some embodiments of the present disclosure, the apparatus 600 may further include a first detection module and a second detection module.

The first detection module is configured to detect the distance between the target vehicle key and the vehicle in a first ranging manner.

The second detection module is configured to detect the distance between the target vehicle key and the vehicle in a second ranging manner if the distance between the target vehicle key and the vehicle detected in the first ranging manner is less than a second preset threshold.

The control module 602 is configured to control the vehicle to perform the first welcoming action in the found welcoming manner if the distance between the target vehicle key and the vehicle detected in the second ranging manner is less than a third preset threshold, where the first preset threshold is greater than the second preset threshold, the second preset threshold is greater than the third preset threshold, and a measurement precision of the second ranging manner is higher than and a measurement precision of the first ranging manner.

In some embodiments of the present disclosure, the apparatus 600 may further include an obtaining module.

The obtaining module is configured to: obtain an ambient volume of an environment where the vehicle is located; obtain a voice instruction around the vehicle if the distance between the target vehicle key and the vehicle detected in the second ranging manner is less than the third preset threshold when the ambient volume is less than a preset volume threshold; and obtain the voice instruction around the vehicle if the distance between the target vehicle key and the vehicle detected in the second ranging manner is less than a fourth preset threshold when the ambient volume is greater than or equal to the volume threshold, the fourth preset threshold being less than the third preset threshold.

The control module 602 is further configured to control the vehicle to perform a second welcoming action indicated in the voice instruction.

In some embodiments of the present disclosure, the obtaining module is further configured to obtain a control instruction sent by the target vehicle key and a remaining state of charge of the vehicle.

The control module 602 is further configured to control the vehicle to perform a third welcoming action indicated in the voice instruction if the remaining state of charge of the vehicle is greater than a preset state of charge threshold.

In some embodiments of the present disclosure, the apparatus 600 may further include a third detection module.

The third detection module is configured to detect orientation information of the target vehicle key relative to the vehicle.

The obtaining module is further configured to obtain a voice instruction for an orientation of a plurality of orientations around the vehicle corresponding to the orientation information, to obtain a voice instruction set.

The control module 602 is further configured to: delete a conflicting instruction in the voice instruction set, where the second welcoming action indicated in the conflicting instruction conflicts with the second welcoming action indicated in the voice instruction for the orientation corresponding to the orientation information; and control the vehicle to perform a second welcoming action indicated in each voice instruction in the updated voice instruction set after the conflicting instruction is deleted.

An operation mode of each module in the above apparatus in the above embodiment has been described in detail in the embodiment related to the method, and therefore details are not described herein.

In the above technical solution, a dedicated welcoming manner is preconfigured for vehicle keys with different IDs, and when an ID of a vehicle key is recognized, a welcoming manner corresponding to the ID is used. In this way, different welcoming manners can be configured for different vehicle keys of the same vehicle, thereby achieving personalized welcoming for multiple owners, and satisfying a personalized requirement of each owner.

The present disclosure further provides an electronic device, including a memory and a processor. The processor stores a computer program. The processor is configured to execute the computer program in the memory, to implement the steps of the above method provided in the present disclosure.

Figure 7:
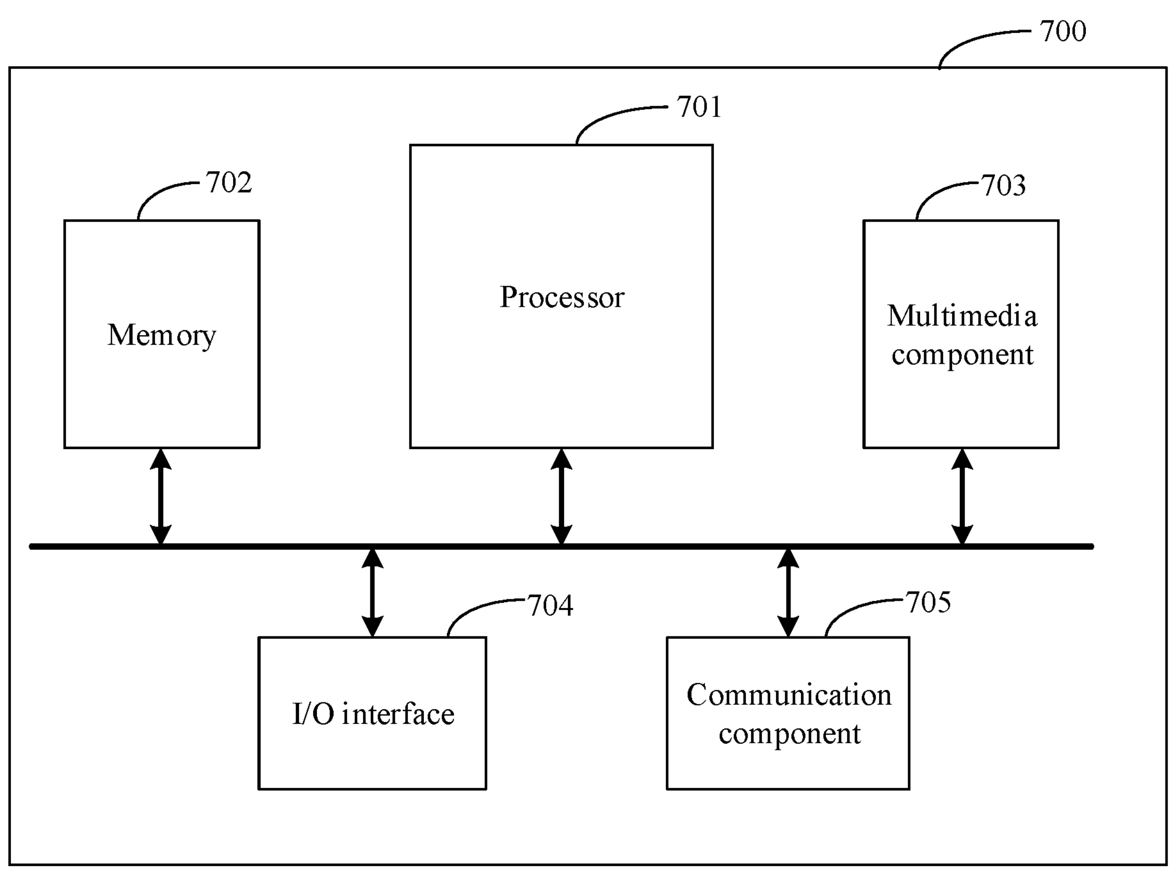
FIG. 7 is a block diagram of an electronic device according to an embodiment of the present disclosure.

FIG. 7 is a block diagram of an electronic device 700 according to an embodiment of the present disclosure. The electronic device 700 may be, for example, a vehicle controller. As shown in FIG. 7, the electronic device 700 may include a processor 701 and a memory 702. The electronic device 700 may further include one or more of a multimedia component 703, an input/output (I/O) interface 704, and a communication component 705.

The processor 701 is configured to control overall operations of the electronic device 700 to complete all or some steps in the above method for controlling welcoming of a vehicle. The memory 702 is configured to store various types of data supporting operations on the electronic device 700. The data may include, for example, instructions of any application or method operation on the electronic device 700 and data related to the application, such as contact data and received/sent messages, pictures, audios, and videos. The memory 702 may be implemented by any type of volatile or non-volatile storage device or a combination thereof, such as a static random access memory (SRAM for short), an electrically erasable programmable read-only memory (EEPROM for short), an erasable programmable read-only memory (EPROM for short), a programmable read-only memory (PROM for short), a read-only memory (ROM for short), a magnetic memory, a flash memory, and a disk or an optical disk. The multimedia component 703 may include a screen and an audio component. The screen may be, for example, a touch screen, and the audio component is configured to output and/or input an audio signal. For example, the audio component may include a microphone for receiving an external audio signal. The received audio signal may be further stored in the memory 702 or sent through the communication component 705. The audio component further includes at least one speaker for outputting the audio signal. The I/O interface 704 provides an interface between the processor 701 and another interface module. Another interface module may be a keyboard, a mouse, buttons, or the like. The buttons may be virtual buttons or physical buttons. The communication component 705 is configured to perform wired or wireless communication between the electronic device 700 and another device. The wireless communication is, for example, one or a combination of Wi-Fi, Bluetooth, near field communication (NFC), 2G, 3G, 4G, NB-IOT, eMTC, or other 5G, which is not limited herein. Therefore, the corresponding communication component 705 may include a Wi-Fi module, a Bluetooth module, an NFC module, and the like.

In an embodiment, the electronic device 700 may be implemented by one or more application specific integrated circuits (ASIC for short), a digital signal processor (DSP for short), a digital signal processing device (DSPD for short), a programmable logic device (PLD for short), a field programmable gate array (FPGA for short), a controller, a microcontroller, a microprocessor, or another electronic element to perform the above method for controlling welcoming of a vehicle.

In another embodiment, a non-transitory computer-readable storage medium is further provided, including program instructions. When the program instructions are executed by a processor, the steps of the above method for controlling welcoming of a vehicle are performed. For example, the computer-readable storage medium may be the above memory 702 including program instructions. The above program instructions may be executed by the processor 701 of the electronic device 700 to complete the above method for controlling welcoming of a vehicle.

In another embodiment, a computer program product is further provided. The computer program product includes a computer program executable by a programmable apparatus. The computer program has a code part, when executed by the programmable apparatus, for performing the above method for controlling welcoming of a vehicle.

The present disclosure further provides a vehicle, including the above apparatus 600 for controlling welcoming of a vehicle.

The preferred implementations of the present disclosure are described in detail above with reference to the drawings. However, the present disclosure is not limited to the details in the above implementations. A plurality of simple variations may be made to the technical solutions of the present disclosure within the scope of the technical concept of the present disclosure, and these simple variations fall within the protection scope of the present disclosure.

In addition, it should be noted that, the technical features described in the above implementations may be combined in any proper manner in case of no contradiction. In order to avoid unnecessary repetition, various possible combination manners are not described in the present disclosure.

In addition, various different implementations of the present disclosure may also be arbitrarily combined without departing from the idea of the present disclosure, and the combinations shall still be regarded as the content disclosed in the present disclosure.

What is claimed is:

1. A method for controlling a vehicle welcoming a user, comprising:

detecting, by a processor of the vehicle, a first distance between a target vehicle key and the vehicle with a first ranging method, pairing the vehicle with the target vehicle key through a wireless communication, and recognizing an identification (ID) of the target vehicle key through asymmetric encryption;

searching, by the processor, a correspondence for a welcoming manner corresponding to the ID of the target vehicle key, the correspondence comprising a plurality of IDs of a plurality of vehicle keys and a plurality of welcoming manners corresponding to the IDs of the vehicle keys;

detecting, by the processor, a second distance between the target vehicle key and the vehicle with a second ranging method, and controlling the vehicle to perform a first welcoming action in the welcoming manner, wherein a measurement precision of the second ranging method is higher than a measurement precision of the first ranging method; and obtaining, by the processor, a charging status of the vehicle, and determining whether the charging status of the vehicle is greater than a charging status threshold, wherein the charging status threshold is for determining whether to execute an additional welcoming action corresponding to the ID of the target vehicle key, the charging status is a remaining state of charge of the vehicle, and the welcoming manner comprises configurations of lights, music, or pedal stretching/retraction functions according to the ID of the target vehicle key.

2. The method according to claim 1, wherein recognizing the ID of the target vehicle key comprises:

communicating with the target vehicle key and recognizing the ID of the target vehicle key when a distance between the target vehicle key and the vehicle is less than a first threshold.

3. The method according to claim 2, wherein communicating with the target vehicle key and recognizing the ID of the target vehicle key comprises:

communicating with the target vehicle key through wireless communication, and connecting to and pairing with the target vehicle key;

receiving a public key and ciphertext sent by the target vehicle key, wherein the target vehicle key generates a public-private key pair, encrypts the ID of the target vehicle key by using a private key of the public-private key pair to obtain the ciphertext, and sends the ciphertext and the public key of the public-private key pair to the vehicle; and decrypting the ciphertext based on the public key to obtain the ID of the target vehicle key.

4. The method according to claim 2, wherein after the recognizing the ID of the target vehicle key, the detecting a second distance between the target vehicle key and the vehicle with a second ranging method comprises:

in response to that the first distance is less than a second threshold, detecting the second distance between the target vehicle key and the vehicle with the second ranging method; and controlling the vehicle to perform a first welcoming action in the welcoming manner comprises:

in response to that the second distance is less than a third threshold, controlling the vehicle to perform the first welcoming action in the welcoming manner, wherein the first threshold is greater than the second threshold, and the second threshold is greater than the third threshold.

5. The method according to claim 4, further comprising:

obtaining an ambient volume of an environment where the vehicle is located;

in response to that the second distance is less than the third threshold and the ambient volume is less than a volume threshold, obtaining a voice instruction around the vehicle;

in response to that the second distance is less than a fourth threshold and the ambient volume is greater than or equal to the volume threshold, obtaining the voice instruction around the vehicle, the fourth threshold being less than the third threshold; and controlling the vehicle to perform a second welcoming action indicated in the voice instruction around the vehicle.

6. The method according to claim 1, further comprising:

obtaining a control instruction sent by the target vehicle key; and controlling the vehicle to perform a third welcoming action indicated in the control instruction in response to that the charging status of the vehicle is greater than the charging status threshold, wherein the additional welcoming action comprises the third welcoming action.

7. The method according to claim 5, further comprising: detecting orientation information of the target vehicle key relative to the vehicle; wherein:

the obtaining a voice instruction around the vehicle comprises: obtaining an orientation corresponding to the orientation information from a plurality of orientations around the vehicle, and obtaining a voice instruction for the orientation corresponding to the orientation information.

8. The method according to claim 5, further comprising: detecting orientation information of the target vehicle key relative to the vehicle; wherein:

the obtaining a voice instruction around the vehicle comprises: obtaining a voice instruction in each of a plurality of orientations around the vehicle to obtain a voice instruction set, and obtaining a welcoming action corresponding to each of the voice instructions in the voice instruction set; and the controlling the vehicle to perform a second welcoming action indicated in the voice instruction around the vehicle comprising:

determining whether a welcoming action corresponding to a first voice instruction in the voice instruction set conflicts with the second welcoming action indicated in the voice instruction around the vehicle for an orientation corresponding to the orientation information;

in response to that the welcoming action corresponding to the first voice instruction in the voice instruction set conflicts with the second welcoming action indicated in the voice instruction around the vehicle for the orientation corresponding to the orientation information, deleting the first voice instruction in the voice instruction set to obtain an updated voice instruction set; and controlling the vehicle to perform a welcoming action indicated in each of the voice instructions in the updated voice instruction set.

9. A non-transitory computer-readable storage medium, storing a computer program, wherein when the computer program is executed by a processor, the computer program causes the processor to perform operations comprising:

detecting a first distance between a target vehicle key and the vehicle with a first ranging method, pairing the vehicle with the target vehicle key through a wireless communication, and recognizing an identification (ID) of the target vehicle key through asymmetric encryption;

searching a correspondence for a welcoming manner corresponding to the ID of the target vehicle key, the correspondence comprising a plurality of IDs of a plurality of vehicle keys and a plurality of welcoming manners corresponding to the IDs of the vehicle keys;

detecting a second distance between the target vehicle key and the vehicle with a second ranging method, and controlling a vehicle to perform a first welcoming action in the welcoming manner, wherein a measurement precision of the second ranging method is higher than a measurement precision of the first ranging method; and obtaining a charging status of the vehicle, and determining whether the charging status of the vehicle is greater than a charging status threshold, wherein the charging status threshold is for determining whether to execute an additional welcoming action corresponding to the ID of the target vehicle key, the charging status is a remaining state of charge of the vehicle, and the welcoming manner comprises configurations of lights, music, or pedal stretching/retraction functions according to the ID of the target vehicle key.

10. The medium according to claim 9, wherein recognizing the ID of the target vehicle key comprises:

communicating with the target vehicle key and recognizing the ID of the target vehicle key when a distance between the target vehicle key and the vehicle is less than a first threshold.

11. The medium according to claim 10, wherein communicating with the target vehicle key and recognizing the ID of the target vehicle key comprises:

communicating with the target vehicle key through wireless communication, and connecting to and pairing with the target vehicle key;

receiving a public key and ciphertext sent by the target vehicle key, wherein the target vehicle key generates a public-private key pair, encrypts the ID of the target vehicle key by using a private key of the public-private key pair to obtain the ciphertext, and sends the ciphertext and the public key of the public-private key pair to the vehicle; and decrypting the ciphertext based on the public key to obtain the ID of the target vehicle key.

12. The medium according to claim 10, wherein after the recognizing the ID of the target vehicle key, the operations further comprise:

in response to that the first distance is less than a second threshold, detecting the second distance between the target vehicle key and the vehicle with the second ranging method; and controlling the vehicle to perform a first welcoming action in the welcoming manner comprises:

in response to that the second distance is less than a third threshold, controlling the vehicle to perform the first welcoming action in the welcoming manner, wherein the first threshold is greater than the second threshold, and the second threshold is greater than the third threshold.

13. The medium according to claim 12, wherein the operations further comprise:

obtaining an ambient volume of an environment where the vehicle is located;

in response to that the second distance is less than the third threshold and the ambient volume is less than a volume threshold, obtaining a voice instruction around the vehicle;

in response to that the second distance is less than a fourth threshold and the ambient volume is greater than or equal to the volume threshold, obtaining the voice instruction around the vehicle, the fourth threshold being less than the third threshold; and controlling the vehicle to perform a second welcoming action indicated in the voice instruction around the vehicle.

14. The medium according to claim 9, wherein the operations further comprise:

obtaining a control instruction sent by the target vehicle key; and controlling the vehicle to perform a third welcoming action indicated in the control instruction in response to that the charging status of the vehicle is greater than the charging status threshold, wherein the additional welcoming action comprises the third welcoming action.

15. The medium according to claim 13, wherein the operations further comprise: detecting orientation information of the target vehicle key relative to the vehicle; wherein:

the obtaining a voice instruction around the vehicle comprises: obtaining an orientation corresponding to the orientation information from a plurality of orientations around the vehicle, and obtaining a voice instruction for the orientation corresponding to the orientation information.

16. The medium according to claim 13, wherein the operations further comprise:

detecting an orientation information of the target vehicle key relative to the vehicle; wherein:

the obtaining a voice instruction around the vehicle comprises: obtaining a voice instruction in each of a plurality of orientations around the vehicle to obtain a voice instruction set, and obtaining a welcoming action corresponding to each of the voice instructions in the voice instruction set; and the controlling the vehicle to perform a second welcoming action indicated in the voice instruction around the vehicle comprising:

determining whether a welcoming action corresponding to a first voice instruction in the voice instruction set conflicts with the second welcoming action indicated in the voice instruction around the vehicle for an orientation corresponding to the orientation information;

in response to that the welcoming action corresponding to the first voice instruction in the voice instruction set conflicts with the second welcoming action indicated in the voice instruction around the vehicle for the orientation corresponding to the orientation information, deleting the first voice instruction in the voice instruction set to obtain an updated voice instruction set; and controlling the vehicle to perform a welcoming action indicated in each of the voice instructions in the updated voice instruction set.

17. A vehicle, comprising an apparatus for controlling welcoming a user of the vehicle, wherein the apparatus comprises a storage medium storing a computer program, wherein when the computer program is executed by a processor, the computer program causes the processor to perform operations comprising:

detecting a first distance between a target vehicle key and the vehicle with a first ranging method, pairing the vehicle with the target vehicle key through a wireless communication, and recognizing an identification (ID) of the target vehicle key through asymmetric encryption;

searching a correspondence for a welcoming manner corresponding to the ID of the target vehicle key, the correspondence comprising a plurality of IDs of a plurality of vehicle keys and a plurality of welcoming manners corresponding to the IDs of the vehicle keys;

detecting a second distance between the target vehicle key and the vehicle with a second ranging method, and controlling the vehicle to perform a first welcoming action in the welcoming manner, wherein a measurement precision of the second ranging method is higher than a measurement precision of the first ranging method; and obtaining, by the processor, a charging status of the vehicle, and determining whether the charging status of the vehicle is greater than a charging status threshold, wherein the charging status threshold is for determining whether to execute an additional welcoming action corresponding to the ID of the target vehicle key, the charging status is a remaining state of charge of the vehicle, and the welcoming manner comprises configurations of lights, music, or pedal stretching/retraction functions according to the ID of the target vehicle key.

18. The vehicle according to claim 17, wherein recognizing the ID of the target vehicle key comprises:

communicating with the target vehicle key and recognizing the ID of the target vehicle key when a distance between the target vehicle key and the vehicle is less than a first threshold.

19. The vehicle according to claim 18, wherein communicating with the target vehicle key and recognizing the ID of the target vehicle key comprises:

communicating with the target vehicle key through wireless communication, and connecting to and pairing with the target vehicle key;

receiving a public key and ciphertext sent by the target vehicle key, wherein the target vehicle key generates a public-private key pair, encrypts the ID of the target vehicle key by using a private key of the public-private key pair to obtain the ciphertext, and sends the ciphertext and the public key of the public-private key pair to the vehicle; and decrypting the ciphertext based on the public key to obtain the ID of the target vehicle key.

20. The vehicle according to claim 18, wherein after the recognizing the ID of the target vehicle key, the operations further comprise:

in response to that the first distance is less than a second threshold, detecting the second distance between the target vehicle key and the vehicle with the second ranging method; and controlling the vehicle to perform a first welcoming action in the welcoming manner comprises:

in response to that the second distance is less than a third threshold, controlling the vehicle to perform the first welcoming action in the welcoming manner, wherein the first threshold is greater than the second threshold, and the second threshold is greater than the third threshold.

* * * * *